US009674667B2

(12) United States Patent
Carlsson et al.

(10) Patent No.: US 9,674,667 B2
(45) Date of Patent: Jun. 6, 2017

(54) HANDLING LOCATION DATA IN A MOBILE COMMUNICATIONS NETWORK (71) Applicant: Telefonaktiebolaget L M Ericsson (publ), Stockholm (SE)

(72) Inventors: Richard Carlsson, Stockholm (SE); Tracy Hu, Beijing (CN); Qingyan Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/440,542

(22) PCT Filed: Feb. 5, 2013

(86) PCT No.: PCT/EP2013/052194
§ 371 (c)(1),
(2) Date: May 4, 2015

(87) PCT Pub. No.: WO2014/067668
PCT Pub. Date: May 8, 2014

(65) Prior Publication Data
US 2015/0304818 A1 Oct. 22, 2015

(30) Foreign Application Priority Data
Nov. 5, 2012 (WO) ................ PCT/CN2012/084102

(51) Int. Cl.
H04W 4/02 (2009.01)
H04W 4/04 (2009.01)
H04W 64/00 (2009.01)

(52) U.S. Cl.
CPC ........... *H04W 4/028* (2013.01); *H04W 4/046* (2013.01); *H04W 64/003* (2013.01)

(58) Field of Classification Search
CPC ... H04W 4/028; H04W 4/046; H04W 64/003; H04W 4/02; H04W 4/04; H04W 4/021;
(Continued)

(56) References Cited

U.S. PATENT DOCUMENTS 6,975,873 B1 * 12/2005 Banks ................ H04W 64/00
455/456.1
8,406,770 B2 * 3/2013 Smith ................ G06Q 10/06
455/440

(Continued)

OTHER PUBLICATIONS

Calabrese, Francesco et al., "Estimating Origin-Destination Flows Using Mobile Phone Location Data", IEEE Pervasive Computing, vol. 10, No. 4, Apr. 2011, 36-44.
(Continued)

Primary Examiner — Meless Zewdu
(74) Attorney, Agent, or Firm — Patent Portfolio Builders, PLLC (57) ABSTRACT A method and apparatus for handling location data in a mobile communications network. A network node obtains an average geographical location of a mobile device over a predetermined time period and uses the average geographical location in an area of interest in an Origin Destination matrix. The advantage of using an average geographical location over a period of time is that much less data needs to be stored compared to storing all geographical data, but the data can be reused to define new Origin Destination matrices.

15 Claims, 6 Drawing Sheets (58) Field of Classification Search
CPC ..... H04W 4/023; H04W 4/025; H04W 28/00; H04W 28/0226; H04W 48/04; H04W 40/04; H04W 8/14; H04W 4/022; H04W 64/00; H04W 8/087; H04W 36/00
See application file for complete search history.

(56) References Cited

U.S. PATENT DOCUMENTS

| | | | | |
|---|---|---|---|---|
| 8,738,437 | B2* | 5/2014 | Gailey | G06F 17/30867 705/14.41 |
| 2004/0203904 | A1* | 10/2004 | Gwon | G01S 5/0252 455/456.1 |
| 2006/0053110 | A1* | 3/2006 | McDonald | G06Q 30/02 |
| 2006/0105815 | A1* | 5/2006 | Jendbro | H04W 64/00 455/566 |
| 2007/0162372 | A1* | 7/2007 | Anas | G06Q 10/04 705/35 |
| 2007/0189181 | A1* | 8/2007 | Kirk | G01S 19/14 370/252 |
| 2007/0229354 | A1* | 10/2007 | Natsume | G01S 5/04 342/386 |
| 2007/0260716 | A1* | 11/2007 | Gnanasambandam | G06Q 10/06 709/223 |
| 2010/0134279 | A1* | 6/2010 | Schwartz | G01C 21/20 340/539.13 |
| 2011/0177832 | A1 | 7/2011 | Huang et al. | |
| 2012/0191505 | A1 | 7/2012 | Shang et al. | |
| 2013/0035089 | A1* | 2/2013 | Moritz | G01S 5/0018 455/422.1 |
| 2013/0191215 | A1* | 7/2013 | Metcalf | G06Q 30/02 705/14.58 |
| 2014/0024389 | A1* | 1/2014 | Martinez | H04L 67/22 455/456.1 |

OTHER PUBLICATIONS

Mellegård, Erik, "Obtaining Origin/Destination-matrices from cellular network data", Chalmers University of Technology Department of Mathematical Sciences Master's Thesis in Engineering Mathematics, 2011, 1-44.

* cited by examiner

HANDLING LOCATION DATA IN A MOBILE COMMUNICATIONS NETWORK

TECHNICAL FIELD

The present invention relates to the field of handling location data in a mobile communications network.

BACKGROUND

The ubiquity of mobile devices generates a lot of data about the location and movement of users. This data can be collected and analysed to obtain information such as how and why people make journeys. There are many applications that can use this data. Examples of such applications include:
- Planning of transportation infrastructure; by analyzing when and where people make journeys, transportation infrastructure can be optimized to take into account factors such as the most commonly made journeys, areas of congestions and so on.
- Analyze the effect of natural disasters; in seeing how people's movements respond to natural disasters, the effects can be analyzed and plans put in place for future natural disasters.
- Planning and measuring effectiveness of advertising campaigns.
- Retail planning and site selection; for example, footfall past certain areas can be monitored to determine suitable sites for retail locations (or other types of locations, such as doctors' surgeries, police stations, information kiosks).
- Studying the spread of diseases; for example, the mobility of users known to be infected with a disease can be analyzed.

Of course, it is helpful to have detailed the knowledge about an individual user's location and movement.

Figure 1:
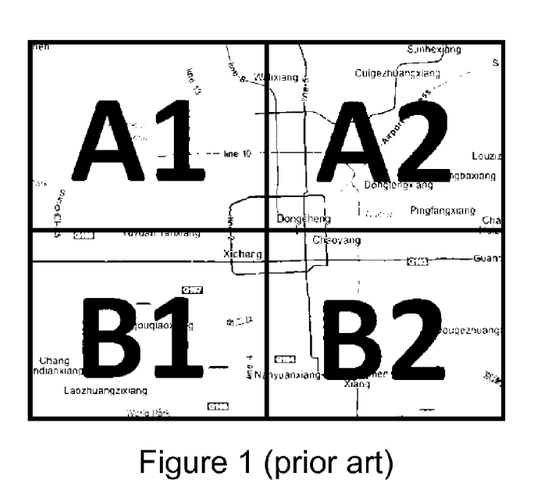
FIG. 1 illustrates schematically a map showing areas of interest for an Origin Destination matrix.

A common way of describing human mobility is using an Origin-Destination Matrix (O/D matrix). FIG. 1 is an example of an O/D matrix in which a geographical area (in this example, central Beijing) is divided into sub areas (also termed areas of interest), in this example A1, A2, B1 and B2. This information is stored in a "Geographical Area Definition Database".

The number of people travelling from one sub area to another sub area is measured or estimated. This may be done, for example, by counting cars on a given road, performing travel surveys, or equipping people with different sensors to measure their movement. The number of people travel between each area is then summarized in a matrix (as shown in Table 1).

TABLE 1

| O/D matrix | | | | |
|---|---|---|---|---|
| 09.00-10.00 | A1 | A2 | B1 | B2 |
| A1 | — | 53215 | 63122 | 83652 |
| A2 | 156093 | — | 3215 | 2352 |
| B1 | 23453 | 256212 | — | 983482 |
| B2 | 9852 | 23561 | 524234 | — |

In the example of Table 1, the number of people who traveled between two areas of interest between the hours of 9 a.m. and 10 a.m. is shown.

As described above, a potential source of location data is from mobile devices. Mobile networks generate a very large amount of data, including location data. Location data may be, for example, GPS co-ordinates of a user's location, or the geographical location of the Access Point to which a user's device is attached. It is possible to build a system that collects location data from mobile networks, analyze it, and expose to be used by different applications and service. An example of such a system is illustrated schematically in a block diagram in FIG. 2. A data collector 1 collects location data from a mobile network 2 and converts it into a usable format. A data analyzer 3 uses the collected location data, and information obtained from an area definitions database 4 containing definitions of geographical areas of interest and a database 5 containing location trace data to create models of mobility. A data exposer 6 stores the mobility models and interfaces with other applications that wish to use the mobility models. The data exposer 6 may also interact with an O/D matrix database 7 to describe mobility.

Figure 2:
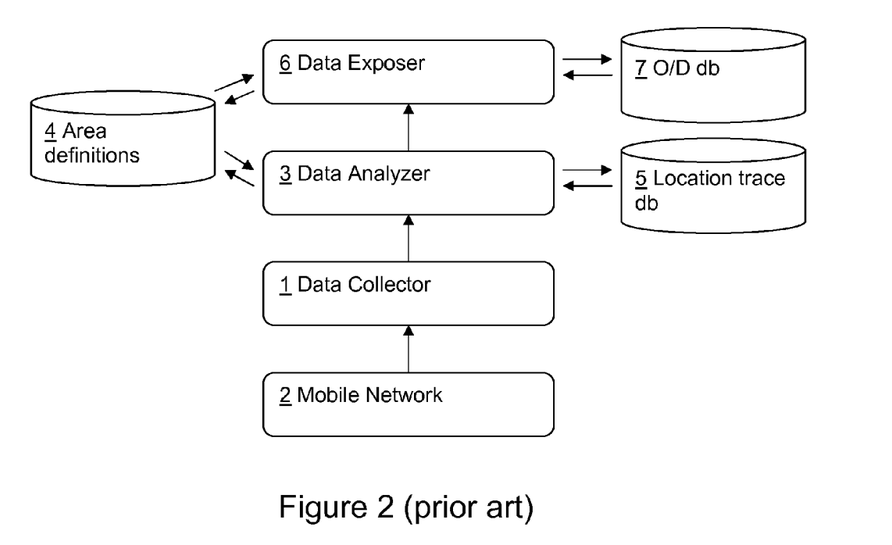
FIG. 2 illustrates schematically in a block diagram a system for collecting location data from a mobile network and creating an Origin Destination matrix.

A system such as the one described in FIG. 2 can be used to create O/D matrices to describe movement in, for example, a city. The analysis performed by the system may be used for a wide variety of purposes. For example, data can be used to plan traffic infrastructure or to plan the location of a shopping mall. Different purposes for the data may require dividing the city into different areas of interest. Even though different mobility patterns need to be studied it is often possible to use the same type of source data.

The O/D matrices that are stored in the O/D database 7 only represent the movement patterns between a fixed set of areas of interest. If another set of area of interests needs to be studied, the O/D matrices need to be recalculated using the same source data. This means that for a system to be able to calculate new matrices based on new areas, the entire source data set needs to be stored. As mentioned above, this requires the storage of a lot of data, as mobile networks generate large amounts of location data. The large amount of source data can also mean that processing-heavy calculations are required on the data set each time a new analysis is to be done. This is expensive in terms of time, resources and storage capacity.

SUMMARY

It is an object of the invention to provide a new way of obtaining and storing mobility data. According to a first aspect, there is provided a method of handling location data in a mobile communications network. A network node obtains an average geographical location of a mobile device over a predetermined time period and uses the average geographical location in an area of interest in an Origin Destination matrix. The advantage of using an average geographical location over a period of time is that much less data needs to be stored compared to storing all geographical data, but the data can be reused to define new Origin Destination matrices.

As an option, the average location is obtained by monitoring a plurality of locations of the device within a predetermined geographical area during the predetermined time period and determining an average location of the plurality of locations.

The average location is optionally determined by applying a weighting factor to each location of the plurality of locations. Examples of weighting factors include factors based on a time duration at each location of the plurality of locations and an area of a geographical location.

As a further option, the Origin Destination matrix is determined by determining a plurality of geographical areas of interest, selecting a first average geographical location of a first mobile device at a first time and relating the first average geographical location to a first geographical area of interest for use as an origin, selecting a second average geographical location of the first mobile device at a second time and relating the second average geographical location to a second geographical area of interest for use as a destination, and determining the Origin Destination matrix using a number of trips of a plurality of mobile devices from the origin to the destination within a predetermined time period.

It will be appreciated that a typical Origin Destination matrix will be constructed using the sort of data described above for a plurality of mobile devices.

As an option, the areas of interest for the Origin Destination matrix are dynamically determined by analysing the average geographical locations of a plurality of mobile devices. In this way, the areas of an Origin destination matrix can be more relevant than if static areas of interest are pre-defined by a user.

The analysis optionally includes a cluster analysis of the average geographical locations over a predetermined time period for a plurality of mobile devices. In this way, locations where many devices cluster together can be defined as an area of interest.

As a further option, the average geographical location of a mobile device over a predetermined time period is determined using geographical data obtained where the mobile device remains within a predefined geographical area. The advantage of this is that where a mobile device moves around but within a small geographical area, for example within an office building, the device can be considered to be stationary at one location rather than constantly moving.

According to a second aspect, there is provided a node for use in a communications network. The node is provided with a processor for obtaining an average geographical location of a mobile device over a predetermined time period. The processor is further arranged to use the average geographical location in an area of interest in an Origin Destination matrix.

As an option, the node further comprises an individual locations database for storing the average geographical location of a mobile device over a predetermined time period.

As a further option, the processor is arranged to obtain the average location by monitoring a plurality of locations of the device within a predetermined geographical area during the predetermined time period and determining an average location of the plurality of locations. The advantage of this is that where a mobile device moves around but within a small geographical area, for example within an office building, the device can be considered to be stationary at one location rather than constantly moving.

The processor is optionally arranged to apply a weighting factor to each location of the plurality of locations to determine the average location. Examples of weighting factors include factors based on a time duration at each location of the plurality of locations and an area of a geographical location.

As a further option, the processor is arranged to determine the Origin Destination matrix by obtaining a plurality of geographical areas of interest from an area definition database, select a first average geographical location of a first mobile device at a first time and relate the first average geographical location to a first geographical area of interest for use as an origin, and select a second average geographical location of the first mobile device at a second time and relate the second average geographical location to a second geographical area of interest for use as a destination, the processor being further arranged to determine the Origin Destination matrix using a number of trips of a plurality of mobile devices from the origin to the destination within a predetermined time period. It will be appreciated that an Origin Destination matrix is typically constructed using data obtained from a plurality of mobile devices.

As a further option, the processor is arranged to determine the areas of interest for the Origin Destination matrix by analysing the average geographical locations of a plurality of mobile devices. The advantage of this is that areas of interest can be dynamically assigned and therefore be more relevant to a particular Origin Destination matrix compared to the case where area of interest are statically predefined by a user or operator.

The processor is optionally arranged to perform a cluster analysis of the average geographical locations over a predetermined time period for a plurality of mobile devices. A cluster analysis advantageously allows areas of interest to be defined as areas in which several mobile devices cluster together, as these will be areas that most users typically visit at some point.

The processor is optionally arranged to determine the average geographical location of a mobile device over a predetermined time period using geographical data obtained where the mobile device remains within a predefined geographical area.

According to a third aspect, there is provided a computer program comprising computer readable code means which, when run from a memory in a processor on a node, causes the node to perform a method as described above in the first aspect.

According to a fourth aspect, there is provided a computer program product comprising a computer readable medium and a computer program as described above in the third aspect, wherein the computer program is stored on the computer readable medium.

According to a fifth aspect, there is provided the method described above in the first aspect, when performed in a vehicle or a vessel.

According to a sixth aspect, there is provide a vehicle or a vessel comprising a node as described above in the second aspect.

DETAILED DESCRIPTION

The following description refers to a mobile device. The term is used herein to refer to any kind of device that is capable of being moved around, and can in some way identify its location. A non-exhaustive list of exemplary mobile devices includes mobile phones, laptops, tablet devices, vehicles, portable gaming devices, cameras, wrist watches and 3D glasses. The skilled person will realise that many other types of device may also be described as a mobile device.

As described above, maintaining a complete set of location data for each mobile user at all times is extremely resource intensive in terms of both storage and processing. It is possible to compress data to reduce storage required, but this makes processing the data even more resource intensive and can lead to inaccurate data.

A new way of handling and storing location data is described herein. In an embodiment of the invention, a data collector 1 collects data from a mobile network 2 relating to the geographical location of a device and this information is stored together with the time. This information is stored in the location trace database 5.

After a certain time interval (for example, 1 hour or 24 hours), the data analyzer 3 analyzes all data collected during the time interval. For each device, the data analyzer 3 finds the locations of devices that have been substantially stationary. There are several ways that this can be done. In one exemplary way, if a device remains within a certain predetermined area for a predetermined time, the device can be thought of as substantially stationary.

Figure 3:
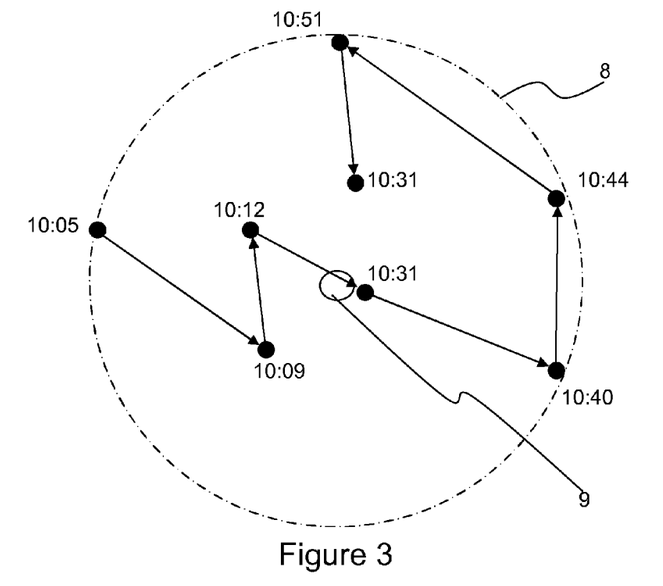
FIG. 3 illustrates schematically a geographical location of a mobile device at different times.

Referring to FIG. 3 herein, a device has visited eight locations within one hour and within an area bound by circle 8. Where the device is in a building, circle 8 may be set to be relatively small, for example 50 meters. The device may move about the building and still remain in this predetermined area for a predetermined time, and so the device user can be thought of as substantially stationary. Where the data is to be used for mapping, say, travel patterns between cities, the diameter of the circle 8 may be larger. Of course, other shapes may be used.

When a device is substantially stationary within the predetermined time period, an average geographical location for the device is determined. In the example of FIG. 3, the average geographical location is the centre 9 of the circle 8. However, there are other ways that an average location can be determined. For example, the average location may be obtained by simply averaging the co-ordinates of the user. Furthermore, co-ordinates may be weighted according to some factor such as the amount of time that a user spends at a particular location within the predetermined geographical area 8.

Figure 4:
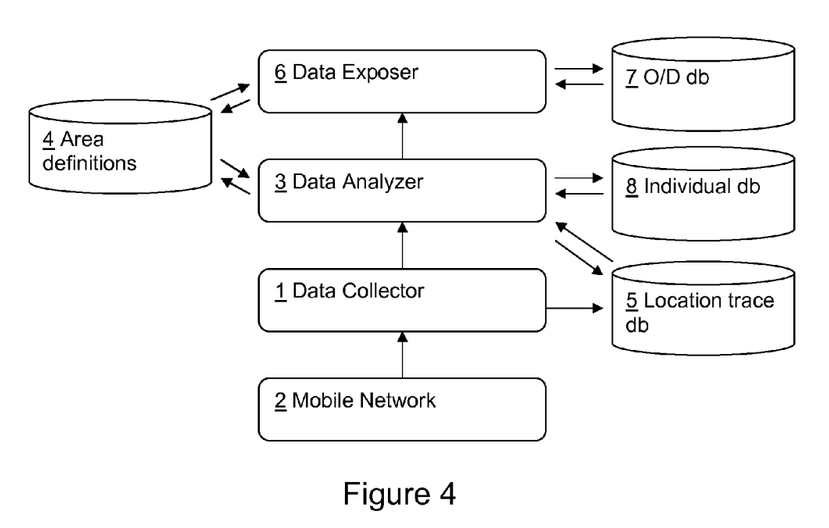
FIG. 4 illustrates schematically in a block diagram a system for collecting location data from a mobile network and creating an Origin Destination matrix according to an embodiment of the invention.

Once the data analyzer 3 has performed the analysis described above, it stores the results of the analysis in an individual location database 8, illustrated in FIG. 4. An example of the sort of information that can be stored by the data analyzer 3 in the individual location database is provided in Table 2, in which a user-id identifying the device, is stored and associated with a start time of the period when the device was substantially stationary, an end time in which the device was substantially stationary, and a latitude and longitude of the average location of the device.

TABLE 2

Example of data stored in individual location database.

| User-id | Start-time | End-time | latitude | longitude |
|---------|-----------|----------|----------|-----------|
| 8611111111 | 10.05 am | 10.59 am | 54.0231 | 131.23123 |
| 8633333333 | 10.30 am | 10.45 am | 55.3134 | 130.11123 |
| 8655555555 | 10.31 am | 10.51 am | 53.1131 | 132.23123 |
| 8677777777 | 10.45 am | 10.52 am | 56.5631 | 134.23663 |
| 8655555555 | 11.15 am | 11.35 am | 54.0231 | 131.23123 |
| 8633333333 | 11.05 am | 11.56 am | 59.3134 | 129.12123 |
| 8611111111 | 11.25 am | 11.50 am | 54.1131 | 133.23123 |

Once all of the data stored in the location trace database 5 has been analyzed, and the results of the analysis stored in the individual location database 8, the data can be removed from the location trace database 5, as it is no longer required. In this way, the techniques described herein greatly reduce the data storage requirements.

The resulting data set that is stored in the individual location database 8 therefore contains all places and times where devices users have been substantially stationary. Each stationary location can be used to determine in which area of interest (obtained from the area definitions database 4) the device was located at a particular time. Alternatively, the data stored in the individual location database 8 can be used by the data analyzer 3 to calculate areas of interest for storing in the area definitions database 4, as described in more detail below.

The data stored in the individual location database 8 can therefore be used to build new Origin Destination (O/D) matrices. Furthermore, since the geographical location of each stationary area for each device is known, the areas of interest for the O/D matrix can be defined in any way needed for the particular analysis use case.

As mentioned above, the average locations of each user can be analyzed to generate new areas of interest for an O/D matrix. This ensures that O/D matrices can be more relevant than if fixed, predetermined geographical areas are used (such as overlaying a grid on a map to obtain each area of interest).

There are several ways that this can be done. An exemplary way is to use algorithms such as clustering algorithms. Clusters can be used to identify areas where a large number of devices remain stationary. This may be, for example, an office location or, on a larger scale, a city centre. In this way, areas of interest can be made to be much more relevant depending on the intended use of the O/D matrix.

In an exemplary embodiment, an algorithm is used to cluster n location data points (such as latitude and longitude pairs) into an unknown number of clusters that can be used as areas of interests. For example, a density can be defined according to Equation 1;

$$f(x) = c \sum_{i=1}^{n} k(x - x_i) \qquad \text{Eq. 1}$$

in which c is a constant and $$k(X) = c^{-ax^2} \qquad \text{Eq. 2}$$

where a is a further constant. The function $f(x)$ has a number of local maxima, where the density is (locally) higher. At such a point, $$0 = \nabla f(x) = \qquad \text{Eq. 3}$$

$$\sum_{i=1}^{n} -a(x - x_i)e^{a(x-x_i)^2} = a \left[ \sum_{i=1}^{n} e^{-a(x-x_i)^2} \right] \left[ \frac{\sum_{i=1}^{n} x_i e^{-a(x-x_i)^2}}{\sum_{i=1}^{n} e^{-a(x-x_i)^2}} - x \right]$$

The term $$\left[\sum_{i=1}^{n} e^{-a(x-x_i)^2}\right]$$

is a scalar term, and so one must only consider the term $$\left[\frac{\sum_{i=1}^{n} x_i e^{-a(x-x_i)^2}}{\sum_{i=1}^{n} e^{-a(x-x_i)^2}} - x\right]$$

when determining the direction of maximum increase to find a cluster. A new term, m(x), can be defined as follows:

$$m(x) = \frac{\sum_{i=1}^{n} x_i e^{-a(x-x_i)^2}}{\sum_{i=1}^{n} e^{-a(x-x_i)^2}} - x \qquad \text{Eq. 4}$$

and $$x^{t+1} = x^t + m(x^t) \qquad \text{Eq. 5}$$

The sequence shown in Equation 5 will converge. All points that converge to the same point are considered to belong to a cluster. Each is cluster can therefore be used to denote an area of interest for the O/D matrix, and the areas of interests area defined as an area containing all stationary locations of a cluster but no stationary locations of any other clusters.

Figure 5:
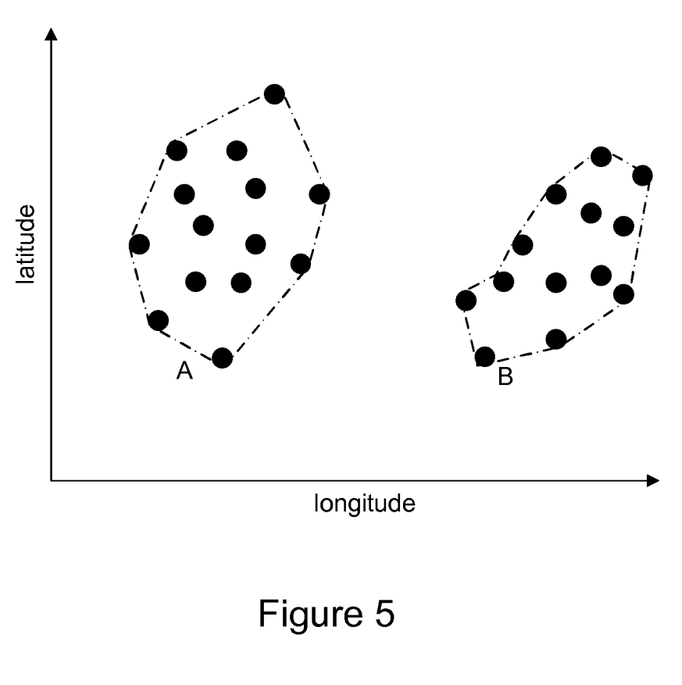
FIG. 5 illustrates clustering of location data according to an embodiment of the invention.

FIG. 5 herein illustrates an example of clusters of locations that can be used as areas of interest in an O/D matrix. In this example, the locations bound by region A form one area of interest, and the locations bound by region B show another area of interest. These defined areas of interest can be stored in the area definitions database 4 and used for generating an O/D matrix.

Figure 6:
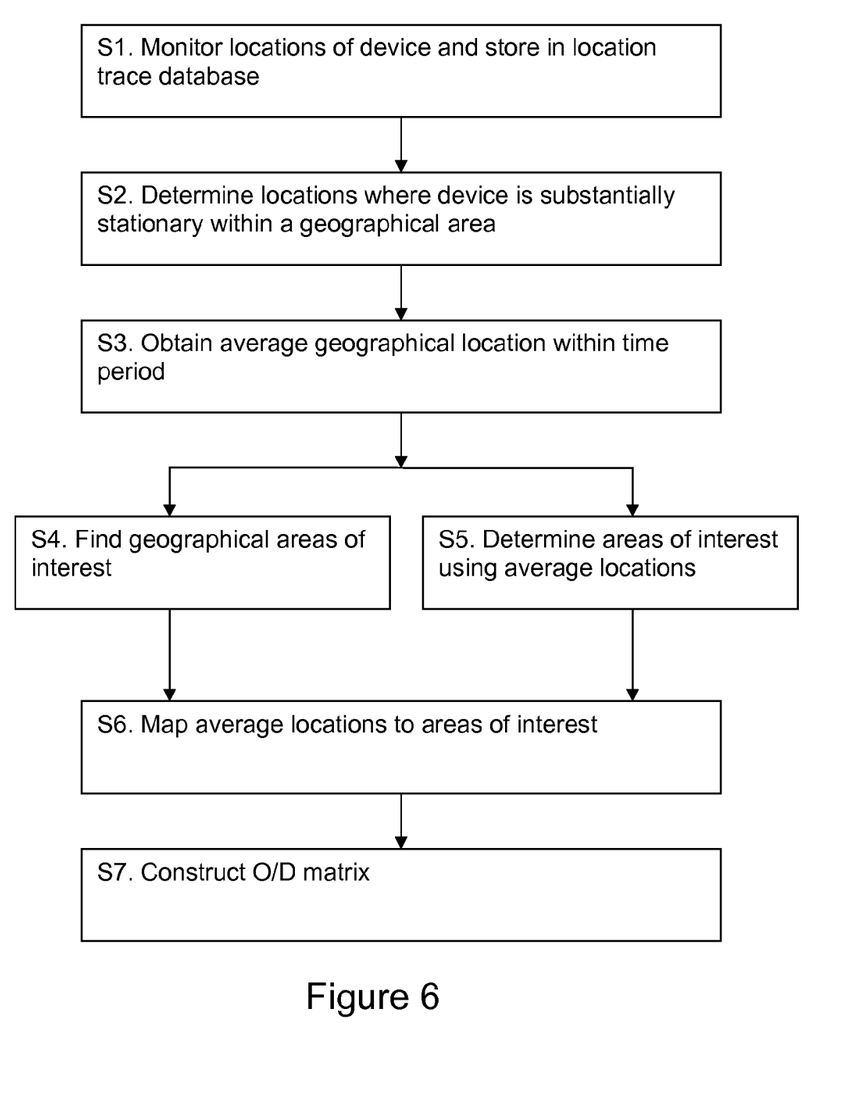
FIG. 6 is a flow diagram illustrating a process for obtaining average geographical locations according to an embodiment of the invention.

Referring to FIG. 6 herein, and using the data in the example in Table 2 above, the O/D matrix can be constructed using the following process:

S1. Locations of a plurality of devices are monitored and stored in a location trace database 5 as described above.

S2. The data analyzer 4 determines the average location of each device when it is substantially stationary. The term stationary is used herein to refer to the device remaining within certain geographical bounds, such as within a certain distance of a first location.

S3. For each device, an average location within a certain time period is obtained, as described above. The average location for each device within each time period is stored in the individual location database 8. There is obviously a far lower storage requirement for each device in the individual location database 8 compared to the location trace database 5. Once the average location has been stored in the individual location database 8, the corresponding location in the location trace database for that device can be removed. This minimizes storage requirements at the location trace database 5.

S4. In one embodiment, geographical areas of interest are obtained from an area definitions database 4. These may be pre-provisioned or have been previously calculated using the average locations. The procedure continues at step S6.

S5. Alternatively, if geographical areas of interest are not available, they may be calculated as described above using the average locations of each device during certain time periods. The calculated areas of interest can be provisioned in the area definitions database 4 for subsequent use.

S6. Each average location is associated with an area of interest for either an origin or destination of an O/D matrix.

S7. The O/D matrix is constructed using the average locations and the areas of interest.

An advantage of this technique is that the average locations can be re-used. For example, an O/D matrix may be required for traffic planning, which places certain requirements on the areas of interest that are most relevant. A subsequent O/D matrix may be required for determining where to site a shopping mall, which may require different areas of interest to be used. The average locations stored in the individual locations database 8 can be used to construct both O/D matrices, and can also be used to calculate different areas of interest for each O/D matrix.

Figure 7:
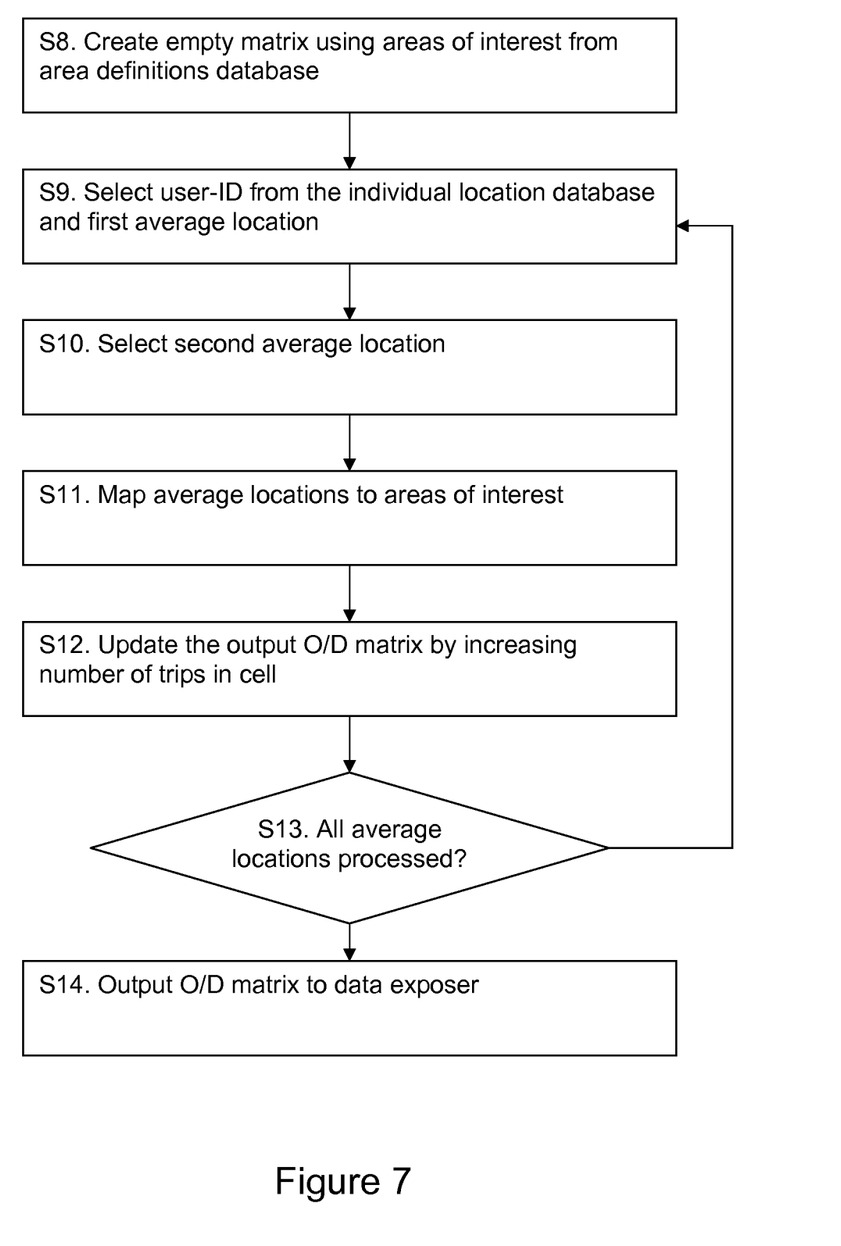
FIG. 7 is a flow diagram illustrating an exemplary process for constructing an Origin Destination matrix.

FIG. 7 illustrates an exemplary process for constructing an O/D matrix (step S7 above) in more detail. The following numbering corresponds to that of FIG. 7.

S8. An empty O/D matrix is created using the identifiers of all geographical areas of interest from the Area Definitions database 4 as each axis.

S9. A user-id is selected and the first average location recorded in the individual location database 8 is selected.

S10. Find the next average location at the required time is selected for the same user-id. The two average locations are used to represent origin and destination of a trip.

S11. The latitude and longitude of the origin and the destination are mapped to the corresponding area of interest (either created or obtained from the areas definition database 4).

S12. Update the output Origin-Destination Matrix by increasing the number of trips in cell corresponding to the origin and destination of the trip. In other words, one is added to the number in the matrix cell denoting the number of trips from the area of interest containing the first average location to the area of interest containing the second average location.

S13. Repeat steps S9 to S12 until all average locations have been processed.

S14. The O/D matrix is output to the data exposer 6.

Figure 8:
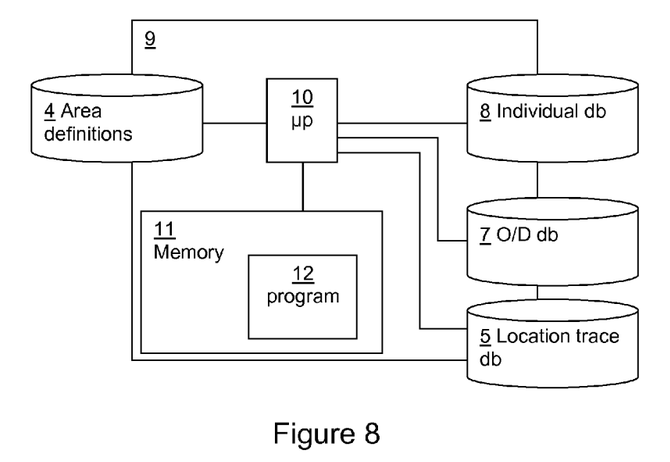
FIG. 8 illustrates schematically in a block diagram an exemplary network node.

The techniques described above can be implemented as a number of nodes in a mobile network. The system would use location data deduced from network events collected from all subscribers in the network. While the functions may be distributed in a network, an exemplary node is shown in FIG. 8, in which a node 9 is provided with a processor 10, a computer readable medium in the form of a memory 12, and access to the area definitions database 4, the location trace database 5, the O/D database 7 and the individual locations database 8.

The memory 11 may also be used to store a computer program 12 which, when executed by the processor 10, causes the processor 10 to implement the techniques described above.

Figure 9:
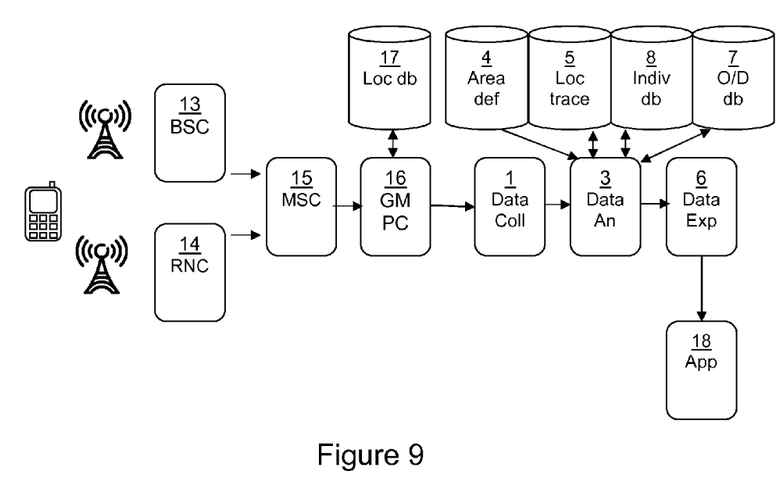
FIG. 9 illustrates schematically in a block diagram an exemplary network according to an embodiment of the invention.

FIG. 9 illustrates an exemplary network according to an embodiment. In this case, the functions may be located primarily at one node, or may be distributed in a communications network. In addition to the functions described above, there is shown a Base Station Controller (BSC) 13, a Radio Network Controller (RNC) 14, a Mobile Switching Centre (MSC) 15, all of which allow a mobile device to connect to the network. A Gateway Mobile Positioning Centre (GMPC) 16 is connected to a locations database 17. An Application Server 18 such as a web application is also shown connected to the data exposer 6. The Application Server 18 may make use of the data output by the data exposer 6.

The MCS 15 receives updates about a mobile device, such as when it attaches to or detaches from a network, when it sends or receives data, when supplementary services are requested or provided to the mobile device, during normal location update procedures and so on. The mobile device has an identifier such as an MSISDN. The GMPC 16 receives the location of the device from the locations database 17 and forwards the location, a timestamp and the device identifier to the data collector 1. The data collector 1 passes the device identifier, the average location and the timestamp to the data analyzer 3. The data collector 1 may also store any of the device identifier, the average location and the timestamp in the location trace database 5. The data analyzer 3 uses the area definitions database 4 and the location trace database 5 to populate the individual database 8 and calculate the O/D matrix. This information is passed to the data exposer 6, which provides the data such as the O/D matrix to any applications 18 that require the information.

The techniques described above ensure that very little source data needs to be stored, while maintaining the ability to freely define areas of interests and make new analysis of the data. This is because average locations over a period of time are stored, rather than every location at every time. Analysis, such as clustering, can be made on the location data before any O/D matrices are generated. This allows geographical areas of interest to be automatically defined based on the travel patterns recorded. As the size of the data set is reduced, the calculation of an O/D matrix requires less processing power than if an O/D matrix were constructed using.

The skilled person will appreciate that various modifications may be made to the above described embodiments without departing from the scope of the present invention as defined in the appended claims. For example, the invention is described with reference to a GSM mobile network, but it will be appreciated that it may be equally applied to handling location data in other types of network.

The following abbreviations have been used in this specification:
BSC Base Station Controller
GMSC Gateway Mobile Switching Centre
GMPC Gateway Mobile Positioning Centre
GSM Global System for Mobile Communications
MSC Mobile Switching Centre
MSISDN Mobile Subscriber ISDN Number
O/D Origin/Destination
RNC Radio Network Controller

The invention claimed is:

1. A method of handling location data in a mobile communications network, the method comprising:
obtaining an average geographical location of each mobile device of a plurality of mobile devices over a predetermined time period, wherein the average geographical location is obtained by monitoring a plurality of locations of each mobile device of the plurality of mobile devices within a predetermined geographical area during the predetermined time period and determining an average location of the plurality of locations; and
using the average geographical location in an area of interest in an Origin Destination matrix, wherein the Origin Destination matrix is determined by:
determining a plurality of geographical areas of interest;
selecting a first average geographical location of each mobile device of the plurality of mobile devices at a first time and relating the first average geographical location to a first geographical area of interest for use as an origin;
selecting a second average geographical location of each mobile device of the plurality of mobile devices at a second time and relating the second average geographical location to a second geographical area of interest for use as a destination; and
determining the Origin Destination matrix using a number of trips of each mobile device of the plurality of mobile devices from the origin to the destination within the predetermined time period.

2. The method of claim 1, wherein the average location is determined by applying a weighting factor to each location of the plurality of locations.

3. The method of claim 2, wherein the weighting factor comprises any of a time duration at each location of the plurality of locations and an area of a geographical location.

4. The method of claim 1, wherein the plurality of geographical areas of interest for the Origin Destination matrix are determined by analyzing average geographical locations-of the plurality of mobile devices.

5. The method of claim 4, wherein the analyzing comprises a cluster analysis of the average geographical locations over the predetermined time period for the plurality of mobile devices.

6. The method of claim 1, wherein the average geographical location of each mobile device of the plurality of mobile devices over the predetermined time period is determined using geographical data obtained where each mobile device of the plurality of mobile devices remains within the predefined geographical area.

7. The method of claim 1, wherein the method is performed in a vehicle or a vessel.

8. A node for use in a communications network, the node comprising:
a processor circuit configured to obtain an average geographical location of each mobile device of a plurality of mobile devices over a predetermined time period, wherein the processor circuit is configured to obtain the average geographical location by monitoring a plurality of locations of each mobile device of the plurality of mobile devices within a predetermined geographical area during the predetermined time period and determining an average location of the plurality of locations;
the processor circuit being further configured to use the average geographical location in an area of interest in an Origin Destination matrix, wherein the processor circuit is configured to determine the Origin Destination matrix by obtaining a plurality of geographical areas of interest from an area definition database, selecting a first average geographical location of each mobile device of the plurality of mobile devices at a first time and relating the first average geographical location to a first geographical area of interest for use as an origin, and selecting a second average geographical location of each mobile device of the plurality of mobile devices at a second time and relating the second average geographical location to a second geographical area of interest for use as a destination, the processor circuit being further arranged to determine the Origin Destination matrix using a number of trips of each mobile device of the plurality of mobile devices from the origin to the destination within the predetermined time period.

9. The node of claim 8, further comprising an individual location database configured to store the average geographical location of each mobile device of the plurality of mobile devices over the predetermined time period.

10. The node of claim 8, wherein the processor circuit is configured to apply a weighting factor to each location of the plurality of locations to determine the average location.

11. The node of claim 8, wherein the processor circuit is configured to determine the areas of interest for the Origin Destination matrix by analyzing average geographical locations of the plurality of mobile devices.

12. The node of claim 11, wherein the processor circuit is configured to perform a cluster analysis of the average geographical locations over the predetermined time period for the plurality of mobile devices.

13. The node of claim 8, wherein the processor circuit is configured to determine the average geographical location of each mobile device of the plurality of mobile devices over the predetermined time period using geographical data obtained where each mobile device of the plurality of mobile devices remains within the predetermined geographical area.

14. A vehicle or a vessel comprising the node of claim 8.

15. A non-transitory computer-readable medium comprising, stored thereupon, a computer program comprising computer readable code means that, when run from a memory by a processor circuit on a node, causes the node to:

obtain an average geographical location of each mobile device of a plurality of mobile devices over a predetermined time period, wherein the average geographical location is obtained by monitoring a plurality of locations of each mobile device of the plurality of mobile devices within a predetermined geographical area during the predetermined time period and determining an average location of the plurality of locations; and use the average geographical location in an area of interest in an Origin Destination matrix, wherein the Origin Destination matrix is determined by obtaining a plurality of geographical areas of interest from an area definition database, selecting a first average geographical location of each mobile device of the plurality of mobile devices at a first time and relating the first average geographical location to a first geographical area of interest for use as an origin, and selecting a second average geographical location of each mobile device of the plurality of mobile devices at a second time and relating the second average geographical location to a second geographical area of interest for use as a destination, the processor circuit further causing the node to determine the Origin Destination matrix using a number of trips of each mobile device of the plurality of mobile devices from the origin to the destination within the predetermined time period.

* * * * *